(No Model.)
F. P. CIRCLE.
WHEEL.
No. 463,740. Patented Nov. 24, 1891.
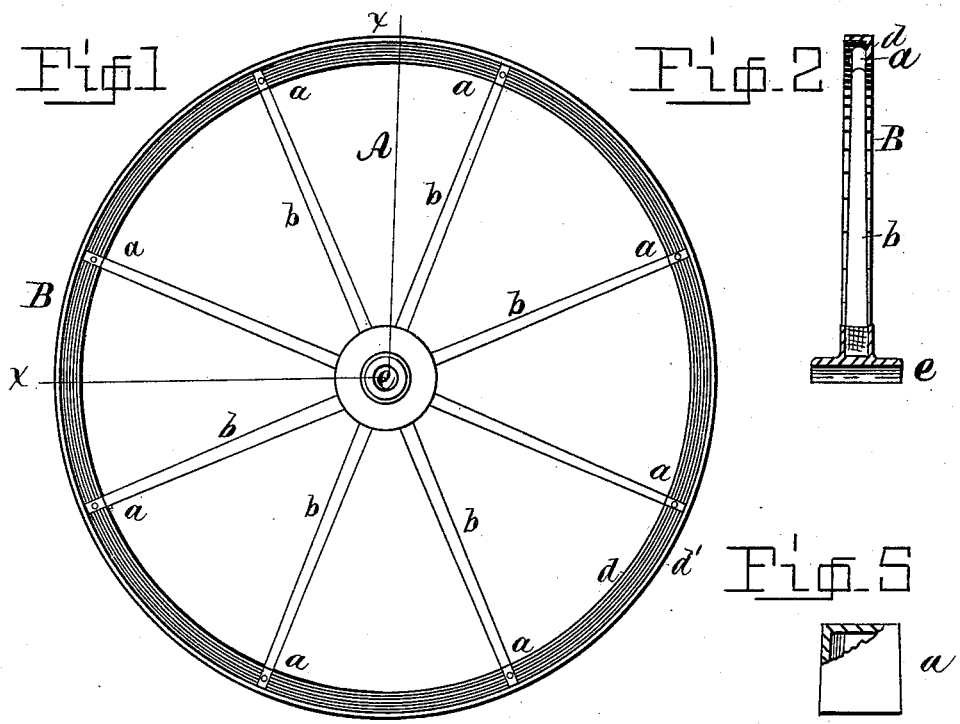
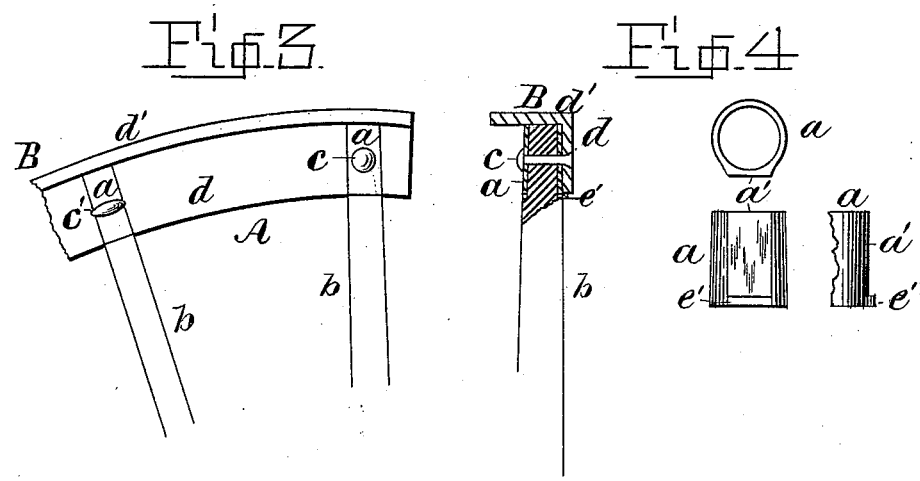
Attest.
R. J. Converse
Ora E. Converse
Inventor.
Franklin P. Circle
B. C. Converse
Atty

UNITED STATES PATENT OFFICE.

FRANKLIN P. CIRCLE, OF SPRINGFIELD, OHIO.

WHEEL.

SPECIFICATION forming part of Letters Patent No. 463,740, dated November 24, 1891.

Application filed July 17, 1891. Serial No. 399,871. (No model.)

*To all whom it may concern:*

Be it known that I, FRANKLIN P. CIRCLE, a citizen of the United States, residing at Springfield, in the county of Clark and State of Ohio, have invented certain new and useful Improvements in Wheels; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in wheels, as described and set forth in the specification, and pointed out in the claims. It applies to wheels for vehicles and agricultural implements.

My invention consists in forming the felly and tire of the wheel of angle-iron bent to the proper circular form, the ends being welded together, or exceptionally (in very small wheels) joined by a riveted plate. The spokes are of wood and driven into the hub in the usual manner. The ends of the spokes have each a thimble or ferrule on them and are secured to the felly by bolts or rivets.

The object of the invention is the production of a cheap wheel, which can be easily and quickly repaired without the services of a skilled workman or the expense incident to the repair of wheels of ordinary construction.

The hub of my improved wheel may be of metal or wood, as desired, and according to the use for which it is intended. In agricultural wheels I prefer a metal hub. For vehicle-wheels iron or wood can be used.

Figure 1 is a front elevation of a wheel embodying my improvements. Fig. 2 is a section of the same through line $x$. Fig. 3 is an enlarged detail of a portion of the felly and portions of two attached spokes with their fastenings, as seen from the front or outside of the wheel; also, a view, partly in section, of one spoke and its attached thimble and the bolt securing it to the felly. Fig. 4 shows views of the open thimble or ferrule. Fig. 5 is a view of the same with a cap or closed end.

In the drawings, A is the wheel, which in Fig. 1 is seen from the outside.

B is a combined felly and tire, which is made of right-angled angle-iron. In large and ordinary sized wheels it is bent into a true circle and the ends welded together, while in small wheels the ends are abutted and a small plate used to connect the latter, which is fastened to the felly ends by rivets. As this mode of connecting iron plates is not new it is not shown in the drawings.

The wheel-rim B is first bent into a true circular form, one flange $d$, which represents the felly, being in the vertical plane of the wheel A and at right angles with the circumferential flange $d'$, which represents the tire. After connecting the ends by welding or otherwise the rim is laid with its back part downward upon an iron table and straightened so as to have all parts brought to a true horizontal plane. The wheel-spider is then formed by driving the spokes $b$ into the hub $e$, (which latter may be of iron or wood, as preferred,) and the extreme outer ends of the spokes $b\ b$ are each fitted with a thimble or ferrule $a$, inclosing the spoke end. This ferrule may be open at the outer end, as shown in the views, Fig. 4, or it may be capped, as seen in Fig. 5, and it may extend inward to the inner edge of the felly $d$, or farther, if desired. In case the thimble is longer than the width of felly $d$ a shoulder $e'$ is formed on the inner end of the thimble, as seen in the two lower views, Fig. 4, and the inner edge or periphery of felly $d$ rests upon this shoulder, which takes a portion of the strain off the end of the spoke, distributing the resistance to the weight of the load. This form of thimble is used in heavy wheels for trucks, &c. The thimble $a$ is preferably made flat on one side $a'$, as seen in the figures last named, this flat side being placed upon the rear side of the spoke, so as to lie against the felly $d$ when the wheel is complete. When the thimbles are all fitted upon the ends of the spokes $b\ b$, they each rest upon a shoulder the thickness of the thimble cut in the spoke, so as to allow the outside of each to be in the same surface-line of the rest of the spoke, so as not to be noticeable when the wheel is painted. When the wheel-spider is completed, it is laid upon the inner (or front) side of the felly $d$, care being taken to have the ends of the spokes fit snugly against the inner side of the tire $d'$ and to be exactly equidistant from each other. A hole is now drilled through each thimble and inclosed spoke end and through the felly $d$, and a bolt $c$ driven through to the rear side, where it can be riveted, as seen in the detail section, Fig. 3. If preferred, screw-bolts can be used instead of rivets.

It will be seen that a spoke can be sprung out and removed after detaching it from the felly with much less trouble than is necessary in removing the spoke from an ordinary wheel, and a new one can be replaced with the same ease. The hub can be made in any form desired to facilitate the ready removal and reinsertion of the spokes. The bolts $c$ are shown as inserted from the front side of the wheel; but they can be inserted from either side or alternated.

In Fig. 3 a clamp-bolt $c'$, having a long head, is shown as a modification of the bolt $c$ on the right in the same figure. These may be used, if preferred, for additionally securing the parts together, the ends of the head (which extends crosswise of the spoke) being bent down over each side of the latter.

I claim as my invention—

1. In a wheel, the combination, with a rim of angle-iron L-shaped in cross-section and the spokes, of thimbles or ferrules on the latter and rivets or bolts extending through said thimbles and the inclosed spoke ends and through the felly-flange, substantially as hereinbefore set forth.

2. In a wheel of the class described, the combination, with a rim, of angle-iron L-shaped in its cross-section, spokes of wood having thimbles on their ends, and bolts or rivets passing through the latter and the felly-flange of said wheel-rim, substantially as set forth.

3. In a wheel having a rim of L-shaped angle-iron, the combination, with the spokes and said rim, of thimbles having a shoulder upon which the felly-flange of the latter rests.

In testimony whereof I affix my signature in presence of two witnesses.

FRANKLIN P. CIRCLE.

Witnesses:
  B. C. CONVERSE,
  C. W. STICKROD.